United States Patent
Lee et al.

(10) Patent No.: US 9,914,801 B2
(45) Date of Patent: Mar. 13, 2018

(54) METHOD FOR PREPARING STEREOBLOCK POLYLACTIDE

(71) Applicant: KOREA RESEARCH INSTITUTE OF CHEMICAL TECHNOLOGY, Daejeon (KR)

(72) Inventors: Jae Chang Lee, Ulsan (KR); Jong Geon Jegal, Daejeon (KR); Bong Keun Song, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 15/534,274

(22) PCT Filed: Dec. 1, 2015

(86) PCT No.: PCT/KR2015/012972
§ 371 (c)(1),
(2) Date: Jun. 8, 2017

(87) PCT Pub. No.: WO2016/093536
PCT Pub. Date: Jun. 16, 2016

(65) Prior Publication Data
US 2017/0342204 A1  Nov. 30, 2017

(30) Foreign Application Priority Data
Dec. 10, 2014 (KR) .................. 10-2014-0177708

(51) Int. Cl.
| | |
|---|---|
| *C08G 63/08* | (2006.01) |
| *C08G 63/85* | (2006.01) |
| *C08G 63/91* | (2006.01) |
| *C08L 101/00* | (2006.01) |
| *C09D 167/04* | (2006.01) |

(52) U.S. Cl.
CPC ............ *C08G 63/08* (2013.01); *C08G 63/85* (2013.01); *C08G 63/91* (2013.01); *C08L 101/00* (2013.01); *C09D 167/04* (2013.01)

(58) Field of Classification Search
CPC .... C08G 63/08; C08G 18/428; C09D 167/04; C09J 167/04
See application file for complete search history.

(56) References Cited

U.S. PATENT DOCUMENTS

2010/0324229 A1* 12/2010 Komazawa ............ C08G 63/08
525/450
2014/0148558 A1    5/2014 Helou et al.

FOREIGN PATENT DOCUMENTS

| KR | 20090103865 A | 10/2009 |
| KR | 20130118214 A | 10/2013 |
| KR | 20140001526 A | 1/2014 |

OTHER PUBLICATIONS

Yoshito Ikada, et al; "Maltopentaose-and Maltoheptaose-Carrying Styrene Macromers and Their Homopolymers", Macromolecules, Apr. 1987; vol. 20, pp. 906-908.
Ji-Hyun Kim, et al; "Synthesis and Characterization of Poly(L-lactide)(L-PLA), Poly(D-lactide)(D-PLA) and Stereocomplex-poly(lactide)(PLA)", Polymer(Korea), vol. 35, No. 1, pp. 52-59, 2011.
International Search Report dated Mar. 10, 2016; PCT/KR2015/012972.

* cited by examiner

*Primary Examiner* — Gregory Listvoyb
(74) *Attorney, Agent, or Firm* — Ladas & Parry LLP; Loren K. Thompson (57) ABSTRACT

The present invention relates to a method for preparing a stereoblock polylactide, comprising: a step of obtaining a first reaction mixture with a monomer conversion rate of 80 to 95% by adding a catalyst to a D-lactide and growing a PDLA chain; a step of obtaining a second reaction mixture with a monomer conversion rate of 80 to 95% by adding an L-lactide to the first reaction mixture and growing a racemic PDLLA chain at the end of the PDLA chain; and a step of further adding an L-lactide to the second reaction mixture and growing a PLLA chain at the end of the PDLLA chain through a polymerization reaction. The preparation method is capable of providing a more convenient synthesis by skipping a process of removing residual monomers in the middle of the reaction, and also of preventing multi-blocking and oligomerization of polymer chains due to a mixture of chains by gradually adding polymerizable monomers while controlling the monomer conversion rate in a one-port synthesis, thereby reducing chain transfer during the polymerization.

6 Claims, 5 Drawing Sheets

METHOD FOR PREPARING STEREOBLOCK POLYLACTIDE

TECHNICAL FIELD

The present invention relates to a method for preparing a stereoblock polylactide (sb-PLA), and more particularly, to a one-pot synthetic method of a stereoblock polylactide (sb-PLA) by a two-step ring opening reaction of lactide.

BACKGROUND ART

Petroleum-based resins such as polyethylene terephthalate, nylon, polyolefin, and soft polyvinyl chloride (PVC) are still widely used as materials for various applications. However, since such petroleum-based resins are not biodegradable, they may cause environmental contamination including the emission of a large amount of carbon dioxide, which is a global warming gas, when disposed. In addition, due to the gradual depletion of petroleum resources, recently, the use of a biomass-based resin, particularly, a polylactide resin is extensively examined.

However, since such a polylactide resin has insufficient heat resistance, humidity resistance, or mechanical properties when compared with a petroleum-based resin, there was a limitation on the application field or use thereof.

In 1987, Ikeda et al. found that a mixture of the enantiomers of poly(L-lactide) (PLLA) and poly(D-lactide) (PDLA) produces a stereo-complex crystal having a melting temperature (Tm) of 230° C., i.e., which is higher by 50° C. than PLLA and PDLA (see Ikeda, Y et al., *Macromolecules*, 1987, 20, pp. 906-908).

The formation of the stereo-complex is considered due to van der Waals interaction between enantiomeric polymer chains. The crystallinity of the stereo-complex depends on the composition and molecular weight of PLLA and PDLA. With the PLLA and PDLA polymers having low molecular weights, high crystallinity of the stereo-complex may be obtained. On the contrary, with a polymer having a high molecular weight, it is observed that both homo-chiral and stereo-complex crystals are formed at the same time.

As the synthesis of a stereoblock polylactide (sb-PLA) by the two-step polymerization of lactide, as shown in the following Reaction 1, a method including a first step of obtaining a PDLA prepolymer by a ring opening polymerization of D-lactide using an alcohol as an initiator, and a second step of obtaining a sb-PLA by polymerizing L-lactide using the PDLA prepolymer as an initiator, may be illustrated.

[Reaction 1]

The conventional method as above Reaction 1 includes processes of isolating the PDLA prepolymer during the first step, removing remaining monomers included therein, and performing the polymerization of the second step (prepolymer isolation method), such reaction processes are complicated to cause long preparation time and the increase of production cost is inevitable. If the removing process of the remaining monomer can be omitted, a sb-PLA may be synthesized by an even simpler method, and cost reduction may be attained.

In addition, during the latter part of the polymerization of the first and second steps, if monomer conversion is increased to the extent that a monomer concentration is close to an equilibrium monomer concentration, a chain transfer polymerization as shown in the following Reaction 2 may compete. As a result, chain scrambling may occur, and the multi blocking and oligomerization of polymer chains may be promoted. In particular, since the formation of the oligomer may become a factor bringing about the decrease of a molecular weight during melt molding process of a produced polymer, this procedure should be avoided.

[Reaction 2]

PDLA(s)
+
PDLA(l)

PDLA(s)

PDLA-PLLA(s)

+

+

PDLA-PLLA-PDLA(s)-PLLA

PDLA-PLLA(l)

The present inventors have endeavored to examine the two-step polymerization method which is a strong candidate for replacing the prepolymer isolation method, and found that a sb-PLA may be very easily synthesized by applying a novel method using a one-pot synthesis. In addition, it was found that the multi blocking and oligomerization of polymer chains due to chin scrambling may be prevented by decreasing chain transfer during polymerization by adding stepwise the polymerization monomer at the second step while controlling monomer conversion during the one-pot synthesis.

DISCLOSURE OF INVENTION

Technical Problem

An object of the present invention is to provide a method for synthesizing a sb-PLA, wherein the sb-PLA may be synthesized by an even simpler process through omitting a removing process of a remaining monomer.

Solution to Problem

According to the object, the present invention provides a method for preparing a stereoblock polylactide (sb-PLA), comprising (1) adding a catalyst to D-lactide, performing a polymerization reaction to grow a poly(D-lactide) (PDLA) chain and obtaining a first reaction mixture having a monomer conversion of 80% to 95%; (2) adding L-lactide to the first reaction mixture, performing a polymerization reaction to grow a racemic poly(D,L-lactide) (PDLLA) chain at a terminal of the PDLA chain and obtaining a second reaction mixture having a total monomer conversion of D-lactide and L-lactide of 80% to 95%; and (3) adding L-lactide to the second reaction mixture and performing a polymerization reaction to grow a poly(L-lactide) (PLLA) chain at a terminal of the PDLLA chain.

Advantageous Effects of Invention

The method for preparing a stereoblock polylactide according to the present invention does not include a removing process of remaining monomer in the middle of the reaction, which enables simpler synthesis of the sb-PLA. In addition, the multi blocking and oligomerization of a polymer chain due to chain scrambling may be prevented by decreasing chin transfer during polymerization by adding polymerization monomers stepwise while controlling the monomer conversion in one-pot synthesis.

BEST MODE FOR CARRYING OUT THE INVENTION

The method for preparing a stereoblock polylactide (sb-PLA) of the present invention comprises (1) adding a catalyst to D-lactide, performing a polymerization reaction to grow a poly(D-lactide) (PDLA) chain and obtaining a first reaction mixture having a monomer conversion of 80% to 95%; (2) adding L-lactide to the first reaction mixture, performing a polymerization reaction to grow a racemic poly(D,L-lactide) (PDLLA) chain at a terminal of the PDLA chain and obtaining a second reaction mixture having a total monomer conversion of D-lactide and L-lactide of 80% to 95%; and (3) further adding L-lactide to the second reaction mixture and performing a polymerization reaction to grow a poly(L-lactide) (PLLA) chain at a terminal of the PDLLA chain.

(0) Step of Preparing D-Lactide and L-Lactide as Raw Material Monomers

This step is a step for preparing D-lactide and L-lactide as raw material monomers which are used for preparing a stereoblock polylactide (sb-PLA).

The molar ratio of D-lactide and L-lactide as the raw material monomers is not specifically limited, and may be, for example, 1:10 to 10:1, or 1:5 to 5:1.

D-lactide and L-lactide as the raw material monomers are preferably dried sufficiently in a preparation process to avoid the side reaction with a catalyst added, and may be dried in advance, for example, in vacuum for 1 to 10 hours, preferably, 3 to 7 hours.

(1) Step of Preparing Poly(D-Lactide) (PDLA)

In step (1), a catalyst is added to D-lactide, and a poly(D-lactide) (PDLA) chain is grown via a polymerization reaction to obtain a first reaction mixture having the monomer conversion of D-lactide of 80% to 95%.

An alcohol may be used as an initiator in the polymerization reaction, and a ring opening polymerization reaction of the D-lactide is performed to prepare PDLA.

The ring opening polymerization reaction may be performed by adding the D-lactide and the alcohol into a reactor, and adding a catalyst, and then, heating and stirring.

The alcohol may be a monohydric alcohol or a diol, and is not specifically limited. If the monohydric alcohol is used, the compound prepared in step (1) may be represented by PDLA-OH, and if the diol is used, the compound prepared in step (1) may be represented by HO-PDLA-OH.

The catalyst may be stannous octoate ($Sn(Oct)_2$), dibutyltin dilaurate, or dioctyltin dilaurate, and preferably, may be stannous octoate ($Sn(Oct)_2$).

The catalyst may be added in a dissolved state in a solvent. In case where the catalyst is added in a solution state dissolved in a solvent, a removing process of the solvent may be primarily conducted prior to the reaction of the D-lactide and the initiator. The solvent may be aromatic solvents such as toluene, benzene, and xylene; alkyl halogenide solvents such as methylene chloride, and chloroform; aliphatic solvents such as hexane; and organic solvents such as tetrahydrofuran, acetone, and dioxane, and preferably, toluene, benzene, acetone, or tetrahydrofuran.

The reaction of this step (1) may be conducted at a temperature of 150° C. to 250° C., preferably, 170° C. to 220° C. for 10 minutes to 2 hours, and preferably, 15 to 30 minutes. Under such temperature conditions, relatively small amount of a catalyst may be used, and the addition amount of the catalyst may be 0.0001 to 0.001 parts by mole, preferably, 0.0002 to 0.0006 parts by mole based on 1 part by mole of the D-lactide.

The reaction of this step (1) is performed until the monomer conversion of the ring opening polymerization reaction of the D-lactide becomes 80% to 95%, and preferably, 85% to 92%. That is, the reaction is performed until the remaining amount of D-lactide reaches to 5 to 20 mol %, preferably, 8 to 15 mol % based on the initial amount of the added D-lactide as a raw material monomer during the polymerization reaction process.

The molecular weight (Mn (NMR)) of a poly(D-lactide) (PDLA) prepared via step (1) may be 10,000 to 25,000, and preferably, 12,000 to 20,000.

(2) Step of Growing Racemic Poly(D,L-Lactide) (PDLLA) Chain at Terminal of Poly(D-Lactide)

In step (2), L-lactide is added to the first reaction mixture obtained in the previous step (1), and a polymerization reaction is performed to grow a racemic poly(D,L-lactide) (PDLLA) chain at the terminal of the PDLA chain. As a result, a second reaction mixture having the total monomer conversion of D-lactide and L-lactide of 80% to 95% is obtained.

In particular, by adding L-lactide to the first reaction mixture obtained in step (1) and performing polymerization continuously, an L-rich racemic poly(D,L-lactide) (PDLLA) chain is grown at the terminal of the poly(D-lactide) polymerized in step (1).

The monomer conversion in this disclosure may mean the percent of mole number of monomers participating in a polymerization reaction with respect to the total mole number of initially added monomers. For example, if the amount of the remaining monomer after the polymerization reaction is 5 parts by mole based on the total 100 parts by mole of initially added monomer, the monomer conversion may be 95%.

The polymer prepared via step (2) may be represented by PDLA-PDLLA when a monohydric alcohol is used as an initiator in step (1), and may be represented by PDLLA-PDLA-PDLLA when a diol is used as an initiator.

In step (2), the L-lactide may be added in an amount of 10 to 30 mol % based on the total mole number of L-lactide added in step (2) and subsequent step (3). That is, the added amount of L-lactide in step (2) may be 10 to 30 mol %, preferably, 15 to 25 mol % based on the total amount (100 mol %) of L-lactide prepared as the raw material monomer in step (0).

The reaction of step (2) may be conducted while maintaining the reaction temperature in step (1) for 20 minutes to 2 hours, preferably, 30 minutes to 1 hour.

The reaction in step (2) is performed until the total monomer conversion of D-lactide and L-lactide in a reaction mixture reaches 80% to 95%, preferably, 85% to 92%. That is, the reaction is performed until the total remaining amount of D-lactide and L-lactide during the polymerization reaction process is 5 to 20 mol %, preferably, 8 to 15 mol % based on the total amount of D-lactide and L-lactide used until step (2).

The molecular weight (Mn (NMR)) of a polymer prepared through step (2) may be 25,000 to 35,000, preferably, 25,000 to 30.000.

(3) Step of Growing Poly(L-Lactide) (PLLA) Chain at the Terminal of Poly(D,L-Lactide) (PDLLA) Chain In step (3), L-lactide is further added to the second reaction mixture obtained in the previous step (2), and a polymerization reaction is performed to grow a poly(L-lactide) (PLLA) chain at the terminal of the PDLLA chain, thereby finally obtaining a stereoblock polylactide (sb-PLA).

In particular, L-lactide is additionally added to the second reaction mixture obtained in step (2) and the polymerization is continued to grow a poly(L-lactide) (PLLA) chain at the terminal of the polymer (PDLLA-PDLA-PDLLA) in which an L-rich racemic poly(D,L-lactide) (PDLLA) chain is formed at the terminal of the poly(D-lactide) polymerized in step (2).

The polymer prepared via step (3) may be represented by PDLA-PDLLA-PLLA when a monohydric alcohol is used as an initiator in step (1), and may be represented by PLLA-PDLLA-PDLA-PDLLA-PLLA when a diol is used as an initiator.

The added amount of L-lactide in step (3) is a remaining amount which is not added in step (2) among the total amount of L-lactide prepared as the raw material monomer in step (0). For example, the added amount of L-lactide in step (3) may be 70 to 90 mol %, preferably, 75 to 85 mol % based on the total amount (100 mol %) of L-lactide prepared as the raw material monomer in step (0).

The polymerization reaction in step (3) may be performed by additionally adding a catalyst to the second reaction mixture, and the catalyst may be stannous octoate, dibutyltin dilaurate, or dioctyltin dilaurate, preferably, stannous octoate. For example, the same catalyst as the catalyst added in step (1) may be further added.

The catalyst may be added in a dissolved state in a solvent. The solvent may be aromatic solvents such as toluene, benzene, and xylene; alkyl halogenide solvents such as methylene chloride, and chloroform; aliphatic solvents such as hexane; and organic solvents such as tetrahydrofuran, acetone, and dioxane, and preferably, toluene, benzene, acetone, or tetrahydrofuran.

The added amount of the catalyst may be 0.0001 to 0.001 parts by mole, preferably, 0.0002 to 0.0006 parts by mole based on 1 part by mole of the D-lactide.

The reaction of step (3) may be conducted while maintaining the reaction temperature of step (2), and may be conducted for 10 minutes to 2 hours, preferably, for 15 minutes to 30 minutes.

The molecular weight (Mn (NMR)) of a polymer prepared through step (3) may be 50,000 to 80,000, preferably, 60,000 to 75,000.

The reactions of steps (1) to (3) mentioned above may be continuously conducted by a one-pot manner in one reactor.

MODE FOR CARRYING OUT THE INVENTION

Hereinafter, the action and effect of the invention will be described in more detail referring to preferred embodiments. However, the embodiments are for illustration, and the scope of the invention is not limited thereby.

Comparative Example 1

Step (1)

To a 500 ml, three-necked flask equipped with an outlet at the bottom thereof, a motor type agitator and a 500 ml, spherical dropping apparatus were installed to prepare a polymerization apparatus. To the three-necked flask, 80 g of D-lactide and 1.08 g of octadecanol (OD) were added, and 320 g of L-lactide was added to the dropping apparatus, and then, each of the flask and the apparatus was dried under a reduced pressure at room temperature for 24 hours and was substituted with nitrogen. Then, a solution in which stannous octoate was dissolved in toluene in a concentration of 1.0 g/ml was added to the three-necked flask under a nitrogen stream. At this time, the stannous octoate was added thereto in an amount of 1/2500 moles based on 1 mole of the D-lactide. Subsequently, toluene was distilled and removed at room temperature for 2 hours under a reduced pressure, and the inside of the flask was substituted with nitrogen. The three-necked flask was installed on a mantle heater whose temperature was set to 200° C., and heated while stirring for 1 hour to perform polymerization. A polymer polymerized in step (1) was referred to as "20D".

Step (2)

The L-lactide put in the spherical dropping apparatus was heated with a heat gun to melt, and gradually added to a reaction mixture in the three-necked flask. After 10 minutes from the finishing of addition, a toluene solution including 1/2500 moles of stannous octoate was added thereto based on 1 mole of L-lactide, followed by heating and stirring at 200° C. for 1 hour to perform polymerization. After finishing polymerization, a nitrogen pressure (100 mmHg) was applied to the three-necked flask to discharge a polymer from the outlet at the bottom in a strand shape. Then, the polymer was dried at 120° C. under a reduced pressure. The amount of the polymer obtained in the strand shape was 328 g. The polymer polymerized in step (2) was referred to as "20D-80L(1)".

The polymerization of Comparative Example 1 is a reaction of adding stannous octoate which is a catalyst, in both steps (1) and (2), and may be represented by the following Reaction 3.

Table 1 illustrates the polymerization results of a PDLA prepolymer and a di-sb-PLA.

Figure 1:
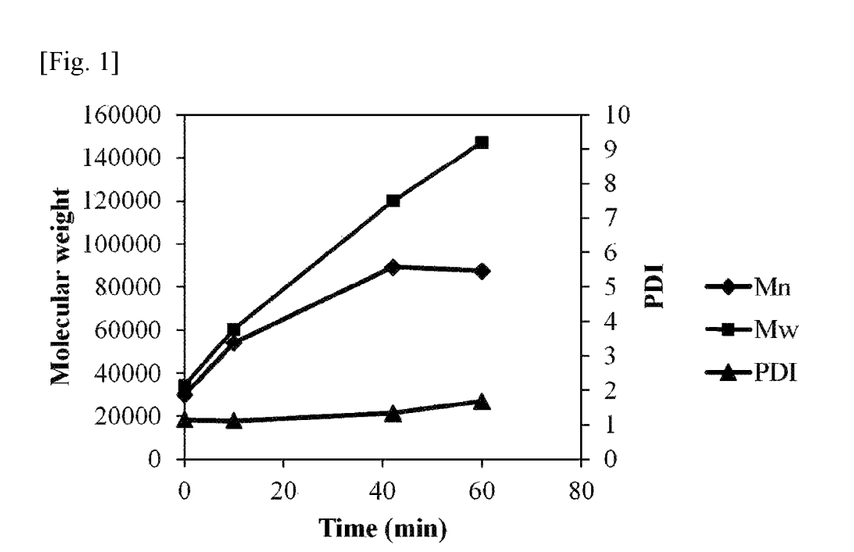
FIG. 1 is a graph illustrating the change of the molecular weight of a di-sb-PLA depending on time during one-pot synthesis with the double addition of a catalyst in double in Comparative Example 1.

The molecular weight (Mn (gpc)) of the PDLA prepolymer in step (1) was 30 kDa, but when L-lactide was added in step (2) and polymerized, it was found that polymerization time and the molecular weight of a polymer increased at the same time as shown in FIG. 1.

TABLE 1

| Polymer name | Initiator | Added amount of D-lactide (g) | Added amount of L-lactide (g) | [M]/[I] | Monomer conversion (%) | $M_n$ (th) $10^3$ Da | $M_n$ (NMR) $10^3$ Da | $M_n$ (GPC) $10^3$ Da | $M_w$ (GPC) $10^3$ Da |
|---|---|---|---|---|---|---|---|---|---|
| 20D | Octadecanol | 80 | | 138.8 | 60.0 | 20 | 10.1 | 29.9 | 34.3 |
| 20D-80L(1) | 20D | | 320 | | 78.1 | 100 | — | 87.4 | 147 |

PDLA-PLLA (20 kDa-80 kDa, D/L=20/80)

D-lactide: 80 g, L-lactide: 320 g, initiator: 1.08 g

Catalyst (step 1): 1/2500 moles based on 1 mole of D-lactide

Figure 2:
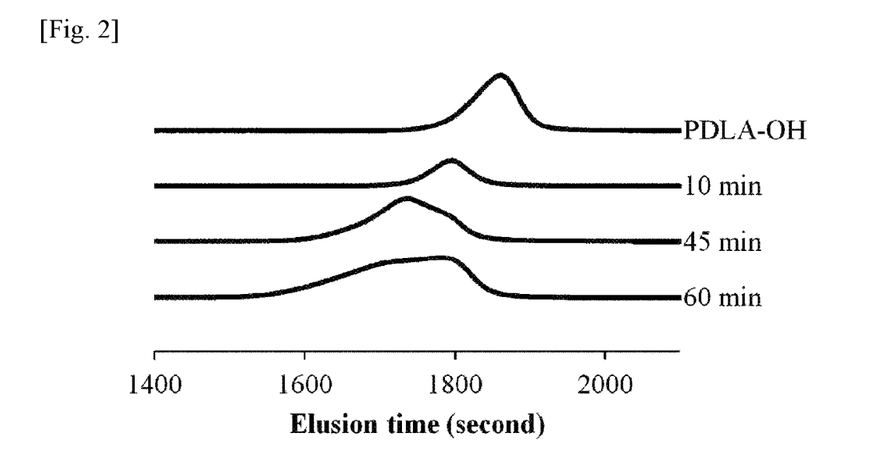
FIG. 2 is a graph depicting a GPC elusion curve during a polymerization process in step (2) of Comparative Example 1.

In FIG. 2, the results of a GPC elution curve during the polymerization process of step (2) were illustrated. After adding L-lactide, an elution curve with a single peak phase was shown, and the progress of polymerization at the terminal of the PDLA prepolymer was identified. After adding the catalyst, an elution curve with a twin peak phase was shown, and it is considered that chain polymerization by the catalyst added in the second step competed with the polymerization.

When observing the strand obtained after the polymerization, little coloring was clearly confirmed.

Comparative Example 2

Step (1)

To a 500 ml, three-necked flask equipped with an outlet at the bottom thereof, a motor type agitator and a 500 ml, spherical dropping apparatus were installed to prepare a polymerization apparatus. To the three-necked flask, 80 g of D-lactide and 1.08 g of octadecanol (OD) were added, and 320 g of L-lactide was added to the dropping apparatus, and then, each of the flask and the apparatus was dried under a reduced pressure at room temperature for 24 hours and was substituted with nitrogen. Then, a solution in which stannous octoate was dissolved in toluene was added to the three-necked flask. At this time, the stannous octoate was added thereto in an amount of ½500 moles based on 1 mole of the total amount of D-lactide and L-lactide added to the three-necked flask. Subsequently, toluene was distilled and removed at room temperature for 2 hours under a reduced pressure, and the inside of the flask was substituted with nitrogen. The three-necked flask was installed on a mantle heater whose temperature was set to 200° C., and heated while stirring for 45 minutes to perform polymerization. A polymer polymerized in step (1) was referred to as "20D".

Step (2)

The L-lactide put in the spherical dropping apparatus was heated with a heat gun to melt, and gradually added to a reaction mixture in the three-necked flask so as to perform polymerization which continuing heating and stirring at 200° C. for 1 hour. After finishing polymerization, a nitrogen pressure (100 mmHg) was applied to the three-necked flask to discharge a polymer from the outlet at the bottom in a strand shape. Then, the polymer was dried at 120° C. under a reduced pressure. The amount of the polymer obtained in the strand shape was 372 g. The polymer polymerized in step (2) was referred to as "20D-80L(2)."

The polymerization of Comparative Example 2 is a method of adding stannous octoate which is a catalyst, in only step (1), and may be represented by the following Reaction 4.

[Reaction 4]

D-Lactide

PDLA—OH

Di-sb-PLA
(PDLA—PLLA)

Figure 3:
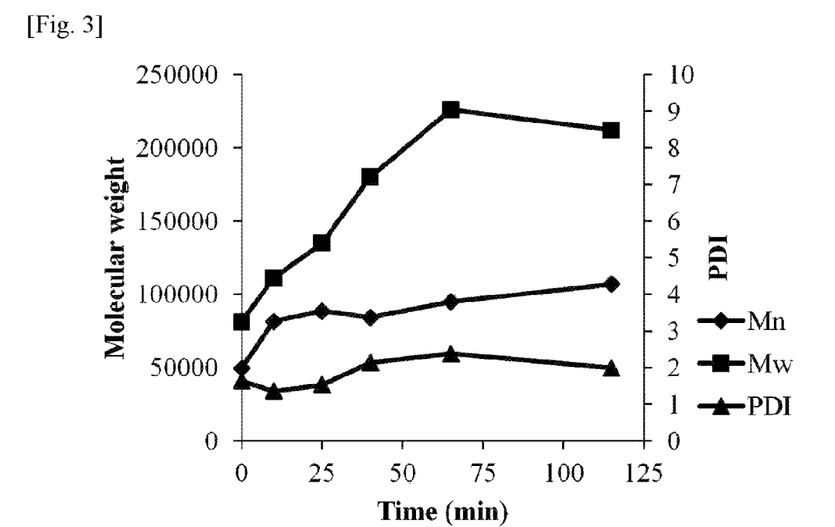
FIG. 3 is a graph showing the change of the molecular weight of a di-sb-PLA depending on time during one-pot synthesis with the addition of a catalyst in step (1) of Comparative Example 2.

Table 2 shows the polymerization results. As the polymerization results in Comparative Example 1, it was found that polymerization time and the molecular weight of a polymer increased at the same time (see FIG. 3).

PDLA-PLLA (20 kDa-80 kDa, D/L=20/80)

D-lactide: 80 g, L-lactide: 320 g, initiator: 1.08 g

Catalyst: ½500 moles based on 1 mole of D-lactide

Figure 4:
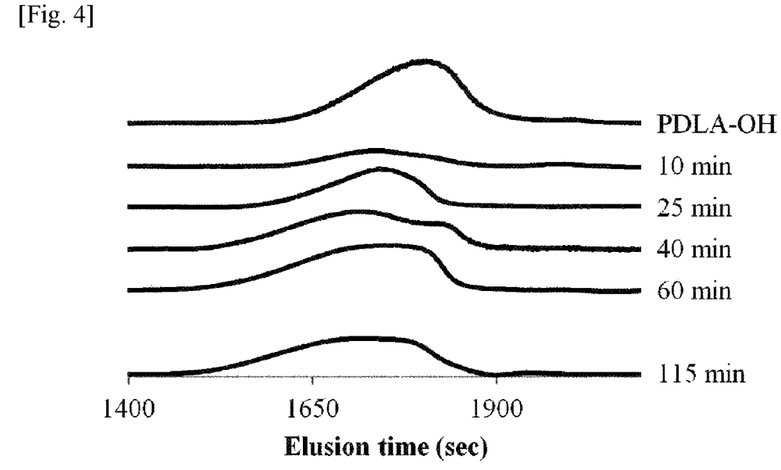
FIG. 4 is a graph representing a GPC elusion curve of a polymer produced during a polymerization process in step (2) of Comparative Example 2.

In FIG. 4, the results of a GPC elution curve of a polymer produced during the polymerization process in step (2) were depicted. In addition, when the polymerization time reached 115 minutes, the molecular weight of the polymer was decreased, or coloring was observed. From the results, it can be found that the influence due to chain transfer increased after monomer conversion reached an equilibrium monomer concentration.

Comparative Example 3

Step (1)

To a 500 ml, three-necked flask equipped with an outlet at the bottom thereof, a motor type agitator and a 500 ml, spherical dropping apparatus were installed to prepare a polymerization apparatus. To the three-necked flask, 80 g of D-lactide and 1.08 g of dodecamethylene glycol (DMG) were added, and 320 g of L-lactide was added to the dropping apparatus, and then, each of the flask and the apparatus was dried under a reduced pressure at room temperature for 24 hours and was substituted with nitrogen. Then, a solution in which stannous octoate was dissolved in toluene was added to the three-necked flask. At this time, the stannous octoate was added thereto in an amount of ½500 moles based on 1 mole of the total amount of D-lactide and L-lactide added to the three-necked flask. Subsequently, toluene was distilled and removed at room temperature for 2 hours under a reduced pressure, and the inside of the flask was substituted with nitrogen. The three-necked flask was installed on a mantle heater whose temperature was set to 200° C., and heated while stirring for 60 minutes to perform polymerization. A polymer polymerized in step (1) was referred to as "15D".

Step (2)

The L-lactide put in the spherical dropping apparatus was heated with a heat gun to melt, and gradually added to a reaction mixture in the three-necked flask so as to perform polymerization while continuing heating and stirring at 200° C. for 1 hour. After finishing polymerization, a nitrogen pressure (100 mmHg) was applied to the three-necked flask to discharge a polymer from the outlet at the bottom in a strand shape. Then, the polymer was dried at 120° C. under a reduced pressure. The amount of the polymer obtained in the strand shape was 368 g. The polymer polymerized in step (2) was referred to as "30D-15D-30L."

The polymerization of Comparative Example 3 is an example of synthesizing a triblock polylactide. The polymerization conditions are the same as Comparative Example 2 except for using diol as an initiator, and may be represented by the following Reaction 5.

TABLE 2

| Polymer name | Initiator | Added amount of D-lactide (g) | Added amount of L-lactide (g) | [M]/[I] | Monomer conversion (%) | $M_n$ (th) $10^3$ Da | $M_n$ (NMR) $10^3$ Da | $M_n$ (GPC) $10^3$ Da | $M_w$ (GPC) $10^3$ Da |
|---|---|---|---|---|---|---|---|---|---|
| 20D | Octadecanol | 80 | | 138.8 | 95.8 | 20 | 20.9 | 49.6 | 81.1 |
| 20D-80L(2) | 20D | | 320 | | 91.7 | 100 | — | 107 | 212 |

[Reaction 5]

Figure 5:
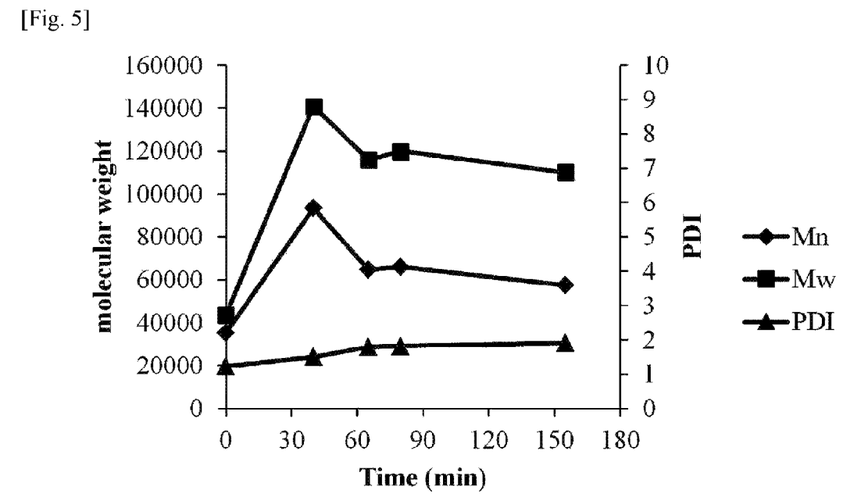
FIG. 5 is a graph demonstrating the change of the molecular weight of a tri-sb-PLA depending on time during one-pot synthesis with the addition of a catalyst in step (1) of Comparative Example 3.

Table 3 demonstrates the polymerization results. As the polymerization results in Comparative Example 1, it was found that polymerization time and the molecular weight of a polymer increased at the same time (see FIG. 5).

TABLE 3

| Polymer name | Initiator | Added amount of D-lactide (g) | Added amount of L-lactide (g) | [M]/[I] | Monomer conversion (%) | $M_n$ (th) $10^3$ Da | $M_n$ (NMR) $10^3$ Da | $M_n$ (GPC) $10^3$ Da | $M_w$ (GPC) $10^3$ Da |
|---|---|---|---|---|---|---|---|---|---|
| 20D 30L-15D-30L | DMG 15D | 80 | 320 | 103.8 | 92.3 92.7 | 15 75 | 12.8 66.1 | 35.1 65.9 | 43.4 120 |

Figure 6:
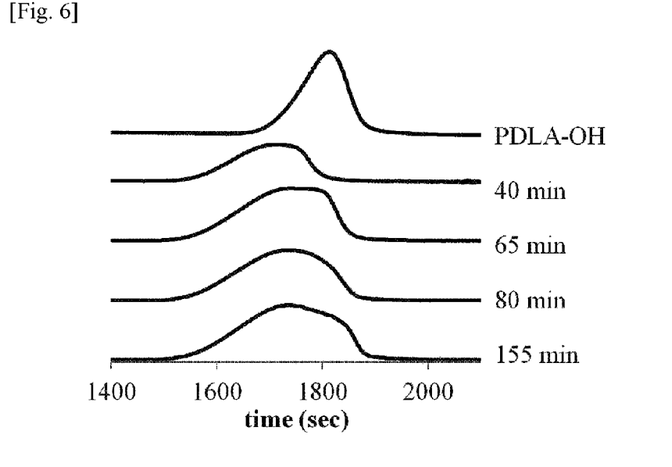
FIG. 6 is a graph describing a GPC elusion curve of a polymer produced during a polymerization process in step (2) of Comparative Example 3.

In FIG. 6, the results of a GPC elution curve of a polymer produced during the polymerization process in step (2) of Comparative Example 3 were illustrated. When the polymerization time reached 65 minutes, the molecular weight of the polymer was decreased, or coloring was observed. From the results, it can be found that the influence due to chain transfer increased after monomer conversion reached an equilibrium monomer concentration.

Thermal Properties of Sb-PLA Obtained by One-Pot Two-Step Polymerization Method

Figure 7:
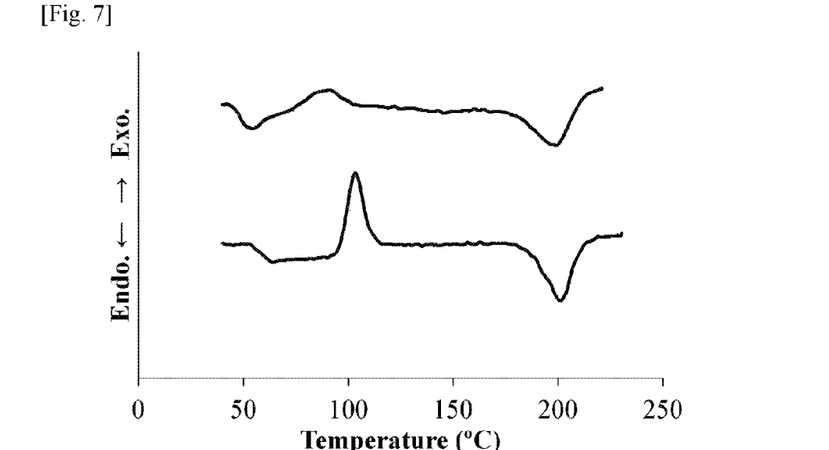
FIG. 7 indicates a typical DSC curve of 20D-80L (2) obtained in Comparative Example 2.

FIG. 7 illustrates a typical DSC curve of 20D-80L (2) obtained in Comparative Example 2. Together with first heating and second heating, a single dissolution peak, which is greater than 200° C. and derived from a stereo-complex crystal, was observed.

In Table 4, the thermal properties of each sb-PLA were summarized. As shown in Table 4, a single melting point caused from the stereo-complex crystal together with a di-sb-PLA and a tri-sb-PLA was observed, and it is confirmed that the formation degree of the stereo-complex is high. However, the melting point was lower by about 10° C. than a sb-PLA sample which was synthesized by performing the polymerization of step (2) after isolating a PDLA prepolymer obtained in step (1) and removing remaining monomer. This reveals that because the remaining monomer was not removed in step (1), D-lactide units were partially mixed with the sequence of a PLLA chain during the polymerization of step (2).

TABLE 4

| | Step (1) | | | | Step (2) | | | | | |
|---|---|---|---|---|---|---|---|---|---|---|
| Polymer name | $Tm_h$ °C. | $\Delta Hm_h$ J/g | $Tm_{sc}$ °C. | $\Delta Hm_{sc}$ J/g | Tg °C. | Tc °C. | $Tm_h$ °C. | $\Delta Hm_h$ J/g | $Tm_{sc}$ °C. | $\Delta Hm_{sc}$ J/g |
| 20D-L80 (1) | — | — | 202.3 | 19.4 | 61.5 | 106.6 | — | — | 202.4 | 22.5 |
| 20D-L80 (2) | — | — | 199.1 | 22.1 | 58.9 | 100.9 | — | — | 201.0 | 22.0 |

TABLE 4-continued

| Polymer name | Step (1) | | | | Step (2) | | | | | |
|---|---|---|---|---|---|---|---|---|---|---|
| | Tm$_h$ °C. | ΔHm$_h$ J/g | Tm$_{sc}$ °C. | ΔHm$_{sc}$ J/g | Tg °C. | Tc °C. | Tm$_h$ °C. | ΔHm$_h$ J/g | Tm$_{sc}$ °C. | ΔHm$_{sc}$ J/g |
| 30L-15D-30L | — | — | 207.1 | 28.5 | 60.4 | 100.5 | — | — | 205.7 | 31.2 |

Figure 8:
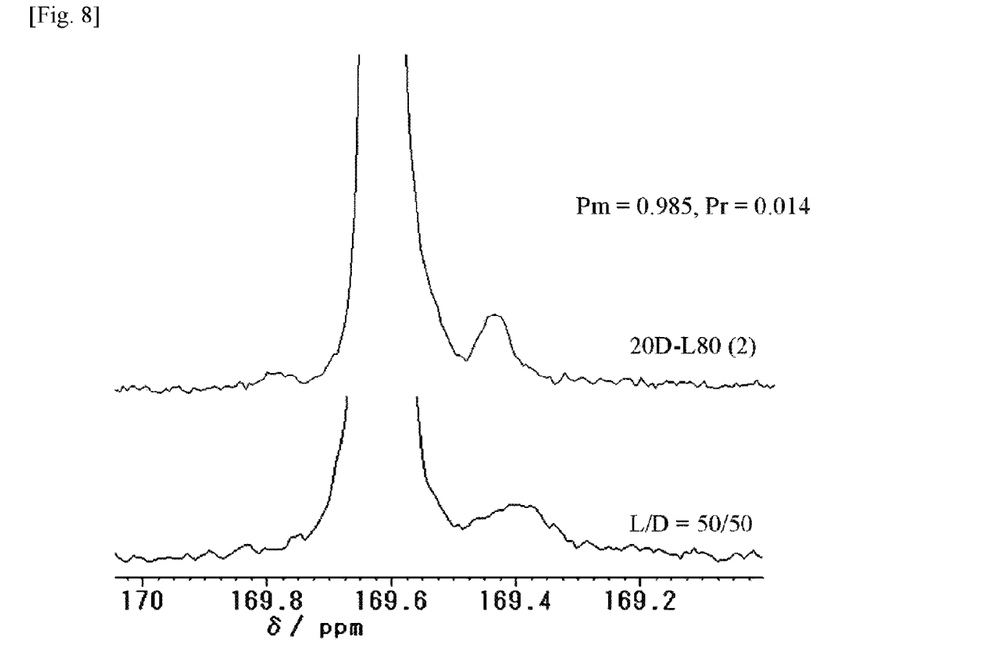
FIG. 8 is a $^{13}$C-NMR spectrum of a di-sb-PLA (20D-80L (2)) and a di-sb-PLA (D/L=50/50).

FIG. 8 illustrates a $^{13}$C-NMR spectrum of a di-sb-PLA (20D-80L (2)) prepared in Comparative Example 2. The peak around 169 ppm corresponds to the carbonyl peak of sb-PLA, and the $^{13}$C-NMR spectrum of a di-sb-PLA (L/D=5/5) separately synthesized for comparison was shown together. 169.6 ppm corresponds to a meso sequence (mmmmm, mmmmr, rmmmm, rmmmr in hexads), and 169.4 ppm corresponds to a racemic sequence (mmrmm, rmrmm, mmrmr, rmrmr in hexads). The latter sequence includes both a racemic unit part and PDLA-PLLA bonding part. The racemic unit in the di-sb-PLA (20D-80L (2)) obtained from the integrating proportion of the peaks was about 1.4%, and this amount is considered to be mainly due to remaining lactide. Since the monomer conversion upon completion of the polymerization of D-lactide in step (1) of Comparative Example 2 was 95.8%, about 4.2% of the remaining monomer was present. Thus, 3.36 g (=80 g×0.042) of D-lactide was mixed in the L-lactide (320 g) which was added during the polymerization in step (2). That is, the ratio of D-lactide among the lactide monomers which was polymerized in step (2) was about 1.0% (=(3.36 g/(320 g+3.36 g))×100), which was the same degree as the racemic unit ratio included in the PLLA block chain of the di-sb-PLA (20D-80L(2)), previously observed. In other words, since the increase of the racemic unit in the PLLA chain during the polymerization of step (2) reduces the melting point or crystallinity of the sb-PLA, a polymerization process restraining such increase is required.

Example 1

Step (0): Preparation of Raw Material Monomer 4.0 g of D-lactide and 16.0 g of L-lactide employed for polymerization were prepared.

To a 100 ml, four-necked flask, a motor type agitator and two of 50 ml, spherical dropping apparatuses (dropping apparatuses A and B) were installed to prepare a polymerization apparatus. To the four-necked flask, 0.053 g of octadecanol and 4.0 g of D-lactide were added. 20% of the prepared amount of L-lactide (16.0 g×0.2=3.2 g) was added to the dropping apparatus A, and remaining 80% of the L-lactide (16.0 g×0.8=12.8 g) was added to the dropping apparatus B. Then, the added D-lactide and L-lactide were dried in vacuum for 5 hours.

Step (1): Preparation of PDLA-OH

After that, dried nitrogen was added to each apparatus, and a solution in which stannous octoate was dissolved in toluene in a concentration of 1.0 g/ml was added to the four-necked flask under a nitrogen stream. At this time, the stannous octoate was added thereto in an amount of 1/2500 moles based on 1 mole of the D-lactide. Toluene was distilled and removed at room temperature under a reduced pressure for 1 hour, and nitrogen substitution was conducted. Subsequently, the four-necked flask was installed in an oil bath of 180° C. and heated and stirred for 20 minutes to perform polymerization. As a result, monomer conversion was up to 91.5%.

Step (2): Preparation of PDLA-PDLLA

L-lactide put in the dropping apparatus A was heated with a heat gun to melt, gradually added to a reaction mixture in the four-necked flask so is to perform polymerization while heating and stirring for 40 minutes. As a result, the monomer conversion was up to 89.8%. A polymer polymerized in step (2) was referred to as "PDLA-PDLLA."

Step (3): Preparation of PDLA-PDLLA-PLLA

Continuously, L-lactide put in the dropping apparatus B was heated with a heat gun to melt, and gradually added to the reaction mixture in the four-necked flask. At this time, a solution in which stannous octoate was dissolved in toluene in a concentration of 0.1 g/mol was added to the four-necked flask, so that 1/2500 moles of stannous octoate based on 1 mole of the total amount of D-lactide and L-lactide in the four-necked flask was added. Then, heating and stirring was continued for 20 minutes to perform polymerization. A polymer polymerized in step (3) was referred to as "PDLA-PDLLA-PLLA".

Figure 9:
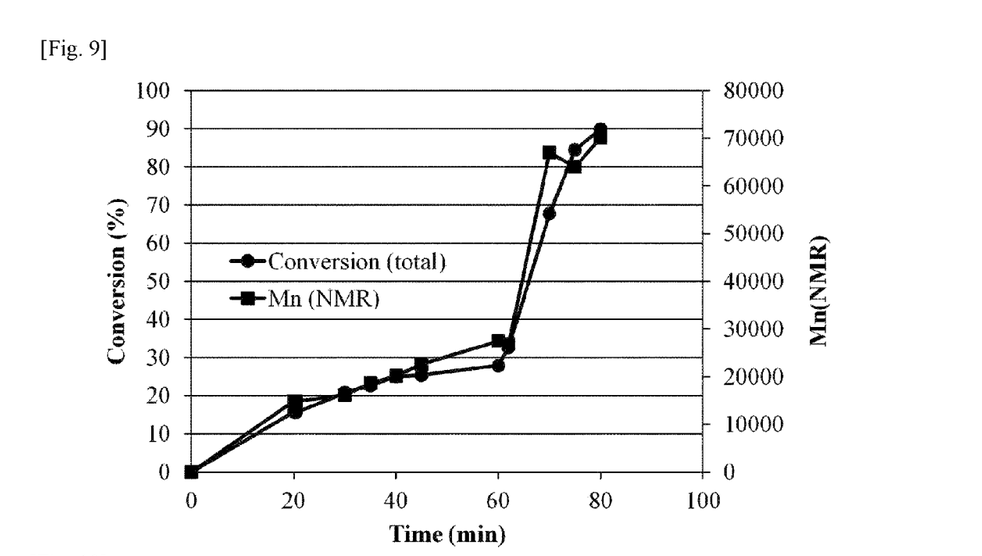
FIG. 9 is a graph presenting the monomer conversion and molecular weight change depending on polymerization time in Example 1.

FIG. 9 illustrates a graph showing the change of a monomer conversion and a molecular weight depending on polymerization time in Example 1.

Referring to FIG. 9, at the point when the polymerization reaction of step (1) elapsed 20 minutes to finish (at a point when the monomer conversion was 91.5%), the molecular weight (Mn (NMR)) of a PDLA prepolymer was about 15,000. However, after adding 20% of the total amount of the L-lactide in step (2), the monomer conversion and the molecular weight thereof were increased. At the point when polymerization time elapsed 60 minutes, the monomer conversion was up to 90%, and the molecular weight of the polymer (PDLA-PDLLA) at this point was about 27,500.

In addition, when adding 80% of the remaining amount of L-lactide and stannous octoate in step (2), the molecular weight increased in proportion to the polymerization time. At the point when the polymerization time elapsed 80 minutes, the monomer conversion was up to 89.9%, and the molecular weight of the polymer (PDLA-PDLLA-PLLA) at this point was about 70,000.

Figure 10:
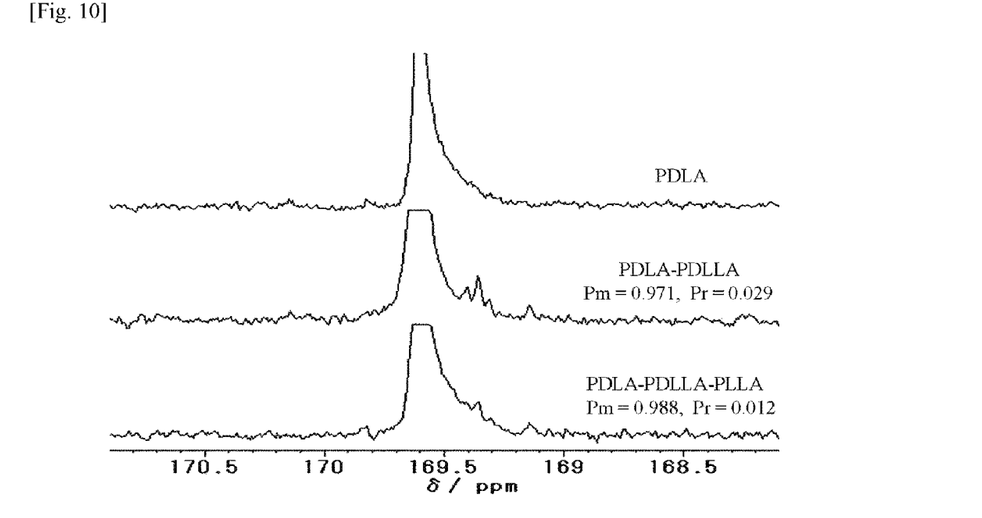
FIG. 10 delineates a $^{13}$C-NMR spectra of PDLA, PDLA-PDLLA and PDLA-PDLLA-PLLA obtained in Example 1.

In FIG. 10, $^{13}$C-NMR spectra of PDLA, PDLA-PDLLA and PDLA-PDLLA-PLLA are shown, which were respectively obtained in steps (1), (2) and (3) of Example 1.

Referring to FIG. 10, a racemic unit of PDLA-PDLLA, which was obtained by adding 20% of the total amount of L-lactide to PDLA and polymerizing in step (2) of Example 1, was about 2.9%. However, in PDLA-PDLLA-PLLA obtained by adding 80% of the remaining L-lactide and polymerizing in step (2), the racemic unit was about 1.2%. As described above, it was found that the stereoblock polylactide (PDLA-PDLLA-PLLA) obtained by the monomer conversion control type one-pot multi-step polymerization method according to the present invention has the reduced racemic unit when compared to the stereoblock polylactide (20D-L80(2)) obtained by the conventional one-pot two-step polymerization method.

In addition, the thermal properties of each polymer prepared in steps (3) and (4) of Example 1 were evaluated and summarized in Table 5 below.

TABLE 5

| Polymer name | Step (1) | | | | Step (2) | | | | | |
|---|---|---|---|---|---|---|---|---|---|---|
| | $Tm_h$ °C. | $\Delta Hm_h$ J/g | $Tm_{sc}$ °C. | $\Delta Hm_{sc}$ J/g | Tg °C. | Tc °C. | $Tm_h$ °C. | $\Delta Hm_h$ J/g | $Tm_{sc}$ °C. | $\Delta Hm_{sc}$ J/g |
| PDLA-PDLLA | — | — | 200.3 | 33.1 | 60.0 | 95.0 | — | — | 199.9 | 37.0 |
| PDLA-PDLLA-PLLA | — | — | 206.9 | 23.9 | 61.3 | 102.0 | — | — | 205.9 | 27.3 |

From the results on the thermal properties of PDLA-PDLLA-PLLA shown in Table 5, the melting point or crystallinity of the sb-PLA was improved when compared to those of 20D-L80 shown in Table 4. From the results, it was found that the polymerization reaction of Example 1 was a polymerization process restraining the increase of the racemic unit in a PLLA chain.

The invention claimed is:

1. A method for preparing a stereoblock polylactide (sb-PLA), which consists essentially of:
   (1) adding a catalyst to D-lactide, performing a polymerization reaction to grow a poly(D-lactide) (PDLA) chain and obtaining a first reaction mixture having a monomer conversion of 80% to 95%;
   (2) adding L-lactide to the first reaction mixture, performing a polymerization reaction to grow a racemic poly(D,L-lactide) (PDLLA) chain at a terminal of the PDLA chain and obtaining a second reaction mixture having a total monomer conversion of D-lactide and L-lactide of 80% to 95%; and
   (3) adding L-lactide to the second reaction mixture and performing a polymerization reaction to grow a poly(L-lactide) (PLLA) chain at a terminal of the PDLLA chain, wherein the reactions in steps (1) to (3) are a one-pot reaction where the reactions are continuously performed in one reactor, wherein the polymerization reaction in step (3) is performed by additionally adding stannous octoate ($Sn(Oct)_2$) to the second reaction mixture as the catalyst.

2. The method of claim 1, wherein the L-lactide in step (2) is added in an amount of 10 to 30 mol % based on a total mole number of L-lactide added in steps (2) and (3).

3. The method of claim 1, wherein the catalyst in step (1) is added in an amount of 0.0001 to 0.001 parts by mole based on 1 part by mole of the D-lactide.

4. The method of claim 1, wherein the catalyst in step (1) is stannous octoate ($Sn(Oct)_2$).

5. The method of claim 1, wherein the D-lactide and the L-lactide are dried in vacuum for 1 to 10 hours.

6. The method of claim 1, wherein the catalyst in step (1) is added hi a dissolved state in a solvent, and the solvent is primarily removed prior to the polymerization reaction.

* * * * *